US 8,116,832 B2

(12) United States Patent
Wang et al.

(10) Patent No.: US 8,116,832 B2
(45) Date of Patent: Feb. 14, 2012

(54) COMBINED APPARATUS OF PHONE HOLDER AND WIRELESS EARSET

(75) Inventors: Yuhua Wang, Beijing (CN); Lun Chai, Hong Kong (CN)

(73) Assignee: Winplus Company Limited, Hong Kong (CN)

( * ) Notice: Subject to any disclaimer, the term of this patent is extended or adjusted under 35 U.S.C. 154(b) by 331 days.

(21) Appl. No.: 12/446,539

(22) PCT Filed: Oct. 24, 2007

(86) PCT No.: PCT/CN2007/003033
§ 371 (c)(1),
(2), (4) Date: Apr. 21, 2009

(87) PCT Pub. No.: WO2008/052429
PCT Pub. Date: May 8, 2008

(65) Prior Publication Data
US 2010/0069130 A1    Mar. 18, 2010

(30) Foreign Application Priority Data

Oct. 26, 2006   (CN) ................... 2006 2 0149119 U
Mar. 19, 2007   (CN) ................... 2007 2 0141517 U
May 16, 2007    (CN) ................... 2007 2 0154717 U

(51) Int. Cl.
 *H04M 1/00*   (2006.01)
(52) U.S. Cl. ............... 455/575.1; 455/575.2; 455/574; 379/330

(58) Field of Classification Search ............ 455/575.8, 455/575.1
See application file for complete search history.

(56) References Cited

U.S. PATENT DOCUMENTS

| 2004/0204209 | A1* | 10/2004 | Bosch ............... 455/575.2 |
| 2005/0255898 | A1* | 11/2005 | Huang .............. 455/575.8 |
| 2006/0019718 | A1* | 1/2006 | Kuo ................. 455/569.1 |
| 2006/0025074 | A1* | 2/2006 | Liang et al. ......... 455/41.2 |
| 2007/0053544 | A1* | 3/2007 | Jhao et al. ........... 381/384 |
| 2007/0093279 | A1* | 4/2007 | Janik ............... 455/569.1 |
| 2008/0057889 | A1* | 3/2008 | Jan ................. 455/185.1 |

FOREIGN PATENT DOCUMENTS

| CN | 2454204 Y     | 10/2001 |
| CN | 1592446 A     | 3/2005  |
| CN | 201049087 Y   | 4/2008  |

* cited by examiner

*Primary Examiner* — Lester Kincaid
*Assistant Examiner* — Isaak R Jama
(74) *Attorney, Agent, or Firm* — The Webb Law Firm

(57) ABSTRACT

The invention relates to a combined apparatus of a phone holder and a wireless earset. The combined apparatus includes a phone holder and a wireless earset used cooperatively with a mobile phone. The phone holder includes a backplate, a bottom plate, a left holding arm, a right holding arm and a mounting structure. The wireless earset includes a casing, an earphone and a microphone. A holding device for holding the wireless earset is provided on the left holding arm or the right holding arm or the backplate of the phone holder.

15 Claims, 16 Drawing Sheets

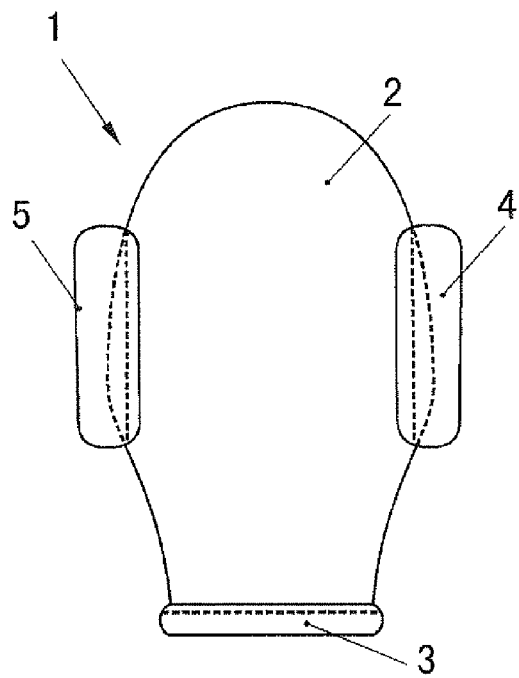
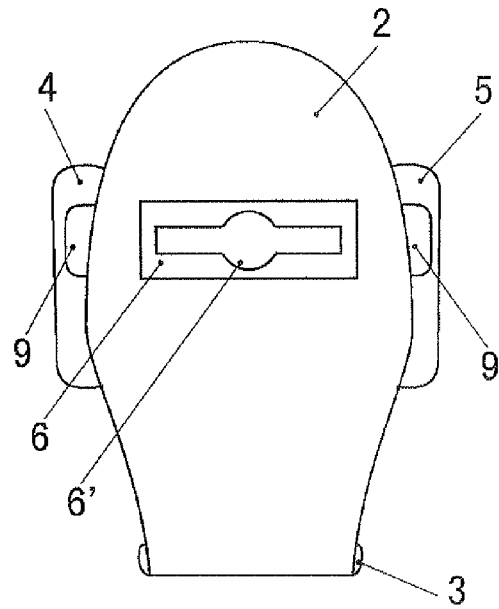
FIG. 1 (a)
FIG. 1 (b)
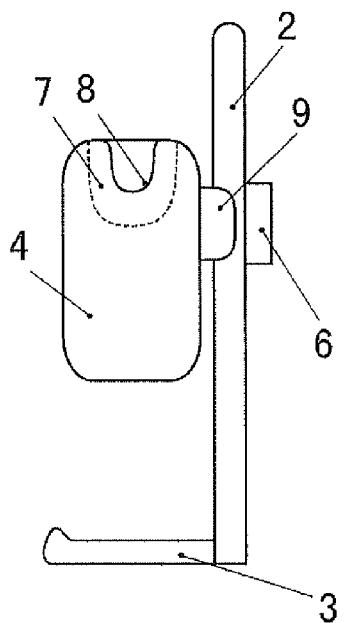
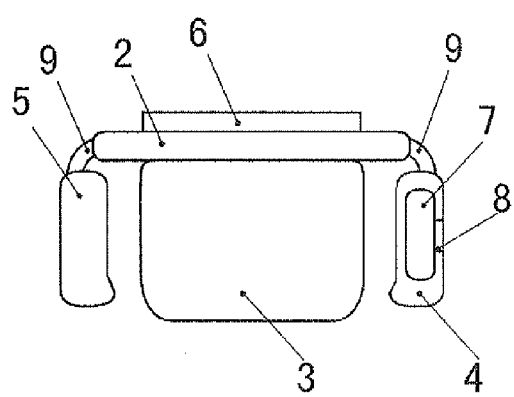
FIG. 1 (c)
FIG. 1 (d)

A A

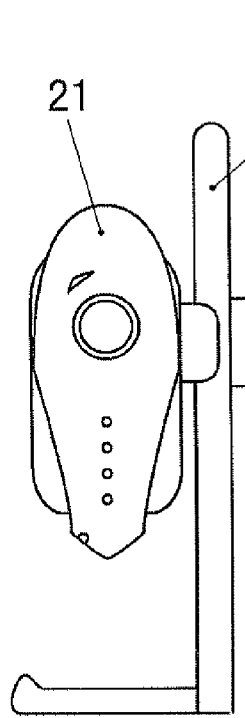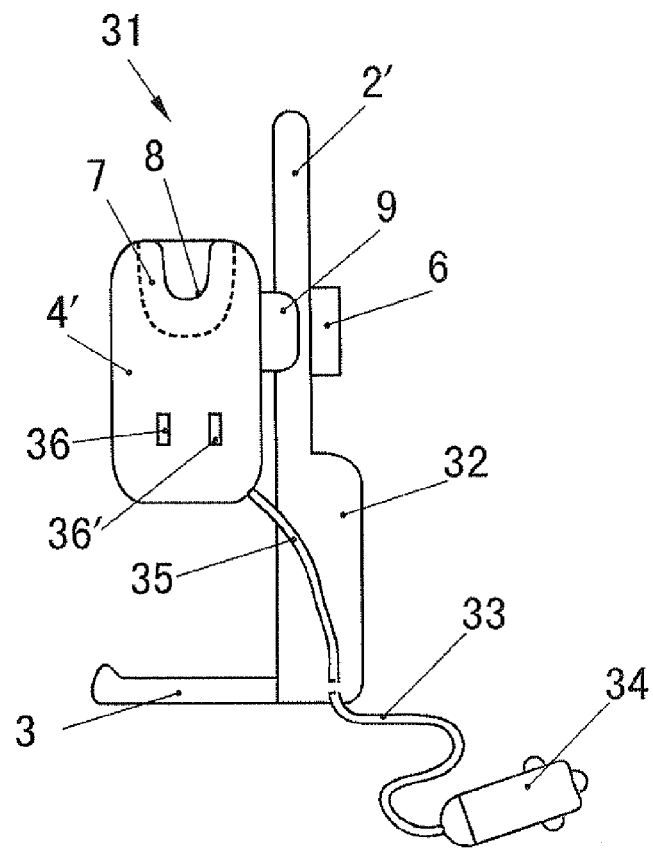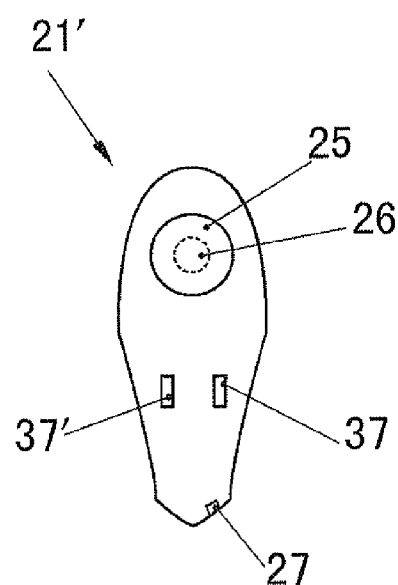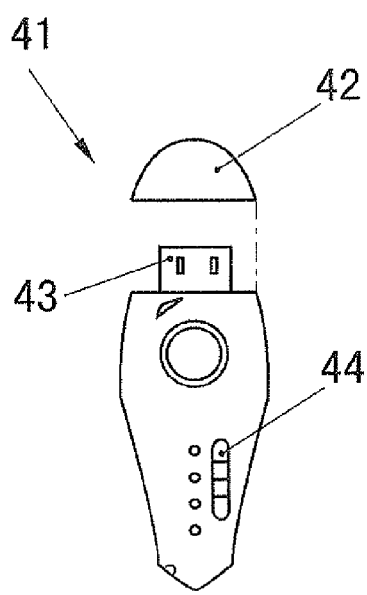
FIG. 4 (c)　　　　　FIG. 5 (a)
FIG. 5 (b)　　　　　FIG. 6

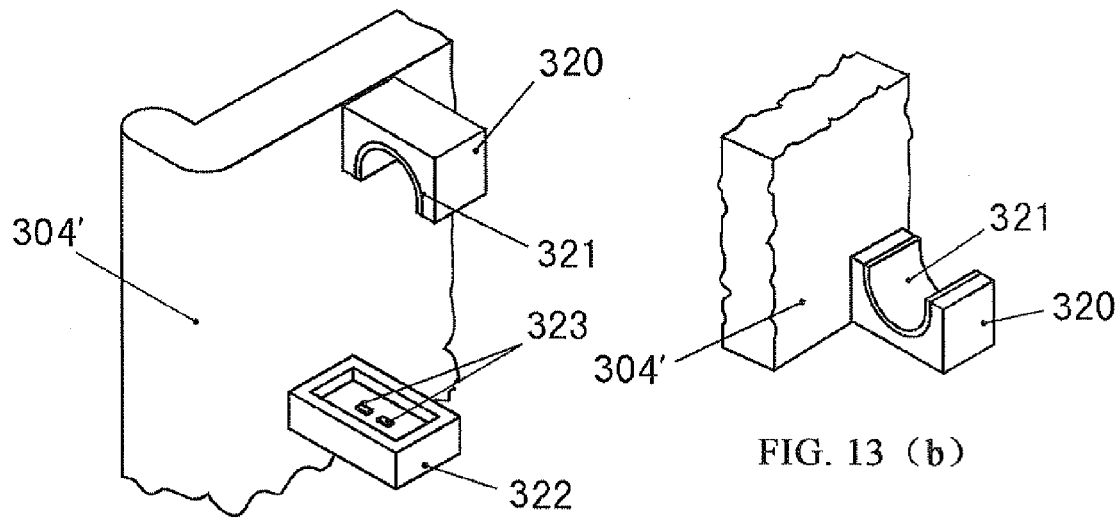
FIG. 13 (a)
FIG. 13 (b)
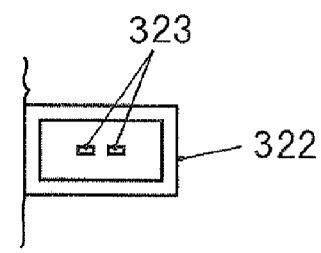
FIG. 13 (c)
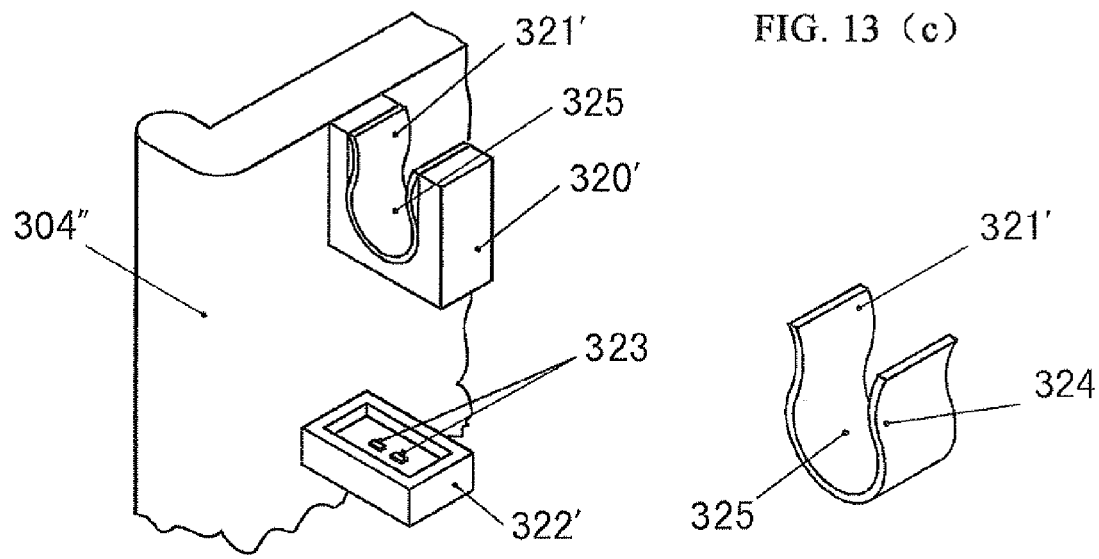
FIG. 14 (a)
FIG. 14 (b)

COMBINED APPARATUS OF PHONE HOLDER AND WIRELESS EARSET

FIELD OF THE INVENTION

The invention relates to an apparatus adapted for use of a mobile phone when an automobile is being driven.

BACKGROUND OF THE INVENTION

The existing wireless earset, such as a wireless earset with a trade name of "Bluetooth", is a handy wireless voice transmission/reception apparatus which may be used cooperatively with a mobile phone. In use, an earphone portion is inserted into ears, so that this mini apparatus is hung outside ears and is not required to be supported by hand. The user still can drive an automobile by both hands while using the mobile phone placed in the automobile. However, there is no a place in the automobile to put the earset conveniently and appropriately, when it is not being used. Therefore, an improved design is still awaited to appear.

SUMMARY OF THE INVENTION

An object of the present invention is to provide a novel combined apparatus of a phone holder and a wireless earset for placing a mobile phone, which can overcome the demerits of the prior art and is convenient for use.

According to the combined apparatus of a phone holder and a wireless earset, the combined apparatus includes: a phone holder; and a wireless earset used cooperatively with a mobile phone. The phone holder includes a backplate, a bottom plate, a left holding arm, a right holding arm and a mounting structure for fixation. The wireless earset includes a casing, an earphone and a microphone. Wherein, a holding device for holding the wireless earset is provided on the left holding arm or the right holding arm or the backplate of the phone holder.

According to the combined apparatus of a phone holder and a wireless earset, the bottom plate of the phone holder can be pulled out from or pushed into a bottom portion of the backplate to regulate a height of the phone holder. The left holding arm and the right holding arm of the phone holder can be pulled out from or pushed into a side portion of the backplate to regulate a width of the phone holder.

According to the combined apparatus of a phone holder and a wireless earset, the holding device is provided at an appropriate position on the left holding arm or the right holding arm or the backplate of the phone holder.

According to the combined apparatus of a phone holder and a wireless earset, the holding device is shaped to match the wireless earset, and has a cavity which can accommodate the earphone of the wireless earset.

According to the combined apparatus of a phone holder and a wireless earset, a holding clip like a pen clip is also provided on the wireless earset. The holding device has a cavity shaped and sized so that the holding clip can be accommodated exactly.

According to the combined apparatus of a phone holder and a wireless earset, the holding device is an expanded cavity which is provided at an appropriate location of the phone holder. The cavity is shaped and sized to match the lower portion of the wireless earset, and can accommodate the wireless earset.

According to the combined apparatus of a phone holder and a wireless earset, the holding device includes two cavities. One of the cavities is shaped to match the earphone of the wireless earset and can accommodate the earphone. The other of the cavities is shaped to match the lower end of the wireless earset and can accommodate the lower end.

According to the combined apparatus of a phone holder and a wireless earset, the holding device holds and fixes the earphone and the lower end of the wireless earset separately.

According to the combined apparatus of a phone holder and a wireless earset, the holding device includes an upper holding cavity and a lower holding pan. The upper holding cavity is U-shaped and opened downward so that the earphone portion of the wireless earset is inserted upwardly.

According to the combined apparatus of a phone holder and a wireless earset, the holding device includes an upper holding cavity and a lower holding pan. The upper holding cavity is U-shaped and opened upward so that the earphone portion of the wireless earset is inserted downwardly.

According to the combined apparatus of a phone holder and a wireless earset, the holding device is formed by adhering one magnetic sheet to an outer surface of the wireless earset and adhering another matching magnetic sheet to a corresponding outer surface of the phone holder.

According to the combined apparatus of a phone holder and a wireless earset, the holding device is formed by adhering one piece of Velcro to an outer surface of the wireless earset and adhering another piece of matching Velcro on a corresponding outer surface of the phone holder.

According to the combined apparatus of a phone holder and a wireless earset, the holding device and the phone holder are provided in such a split manner that the holding device is attached to the phone holder.

According to the combined apparatus of a phone holder and a wireless earset, the holding device and the phone holder are fabricated integrally.

According to the combined apparatus of a phone holder and a wireless earset, a device which converts a direct current source of 12 V in an automobile into a power source suitable for the earset is also provided on the right holding arm or the left holding arm or the backplate. Two electric contacts for recharging the earset are provided on the holding device. At the same time, other two electric contacts which can be correspondingly in contact with the aforesaid two electric contacts for energization are provided on the earset.

According to the combined apparatus of a phone holder and a wireless earset, an expansion portion is also provided on the phone holder. A device which converts a direct current source of 12 V in an automobile into a power source suitable for the wireless earset is provided in said expansion portion. Two electric contacts for supplying power to the wireless earset are provided at appropriate locations on the surface of the holding device of the phone holder. At the same time, other two electric contacts for recharging the wireless earset are also provided at corresponding locations on the outer surface of the wireless earset. A plughole which can be connected to a power source suitable for the wireless earset which is converted from an alternating current source of 100 V~240 V is provided on the phone holder. The inside end of the plughole is connected to the electric contacts which are on the phone holder and for recharging the wireless earset.

According to the combined apparatus of a phone holder and a wireless earset, a port capable of receiving in a wired manner and storing external information is additionally provided in the wireless earset. A cap which can be removed or re-capped is provided at the upper end of the earset. At the same time, a button which can operate and playback the information is provided at an appropriate location of the casing of the earset.

The combined apparatus of a phone holder and a wireless earset of the invention overcomes the demerits of the prior art and is convenient for use. When it is not being used, there is a place in the automobile for the wireless earset to be put conveniently and appropriately and it is more convenient for use.

BRIEF DESCRIPTION OF THE DRAWINGS

FIGS. 1(a) to 1(d) are schematic diagrams of a phone holder in a first embodiment of a combined apparatus of the phone holder and a wireless earset according to the invention, wherein, FIG. 1(a) shows a front face of the phone holder, FIG. 1(b) shows a back face of the phone holder, FIG. 1(c) is a right view of the phone holder, and FIG. 1(d) is a top view of the phone holder.

FIGS. 2(a) to 2(c) are schematic diagrams showing a mounting structure attached to the phone holder of the combined apparatus of the phone holder and the wireless earset according to the invention, wherein, FIG. 2(a) shows a clamping clip, FIG. 2(b) shows a suction cup, and FIG. 2(c) is a sectional view of the suction cup taken along a line A-A of FIG. 2(b).

FIGS. 3(a) and 3(b) are schematic diagrams showing a wireless earset of the first embodiment of the combined apparatus of a phone holder and a wireless earset according to the invention, wherein, FIG. 3(a) is a front view of the earset 21, and FIG. 3(b) is a side view of the wireless earset 21.

FIGS. 5(a) and 5(b) are schematic diagrams showing an additional feature of a variant solution of the first embodiment of the combined apparatus of a phone holder and a wireless earset according to the invention.

FIG. 6 is a schematic diagram showing an additional feature of another variant solution of the first embodiment of the combined apparatus of a phone holder and a wireless earset according to the invention.

FIGS. 7(a) to 7(c) are schematic diagrams showing a general structure and feature of a phone holder of a second embodiment of a combined apparatus of a phone holder and a wireless earset according to the invention, wherein, FIG. 7(a) is a schematic diagram of a basic form of the phone holder according to the second embodiment of the invention, FIG. 7(b) is a rear view of the basic form of the phone holder, and FIG. 7(c) is a schematic diagram showing an additional feature of the basic form of the phone holder.

FIGS. 12(a) to 12(c) are schematic diagrams showing the wireless earset of the third embodiment of the combined apparatus of a phone holder and a wireless earset according to the invention, wherein, FIG. 12(a) is a side view of the wireless earset, FIG. 12(b) is a front view of the wireless earset, and FIG. 12(c) is a back view of the wireless earset.

FIGS. 13(a) to 13(c) are schematic diagrams showing the third embodiment of the combined apparatus of a phone holder and a wireless earset according to the invention, in which an upwardly inserting holding device is attached to a right holding arm of the phone holder of the apparatus.

FIGS. 14(a) and 14(b) are schematic diagrams showing the third embodiment of the combined apparatus of a phone holder and a wireless earset according to the invention, in which a downwardly inserting holding device is attached to a right holding arm of the phone holder of the apparatus.

DETAILED DESCRIPTION OF THE PREFERRED EMBODIMENTS

Figure 2:
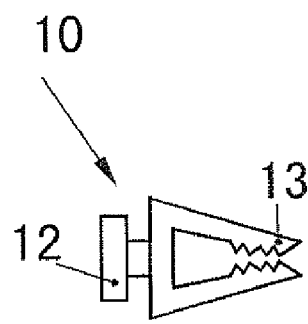
Figure 2:
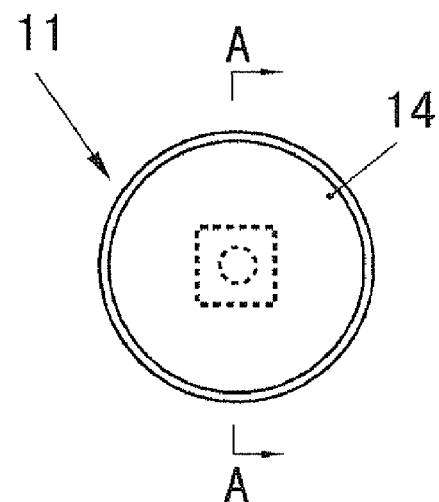
Figure 2:
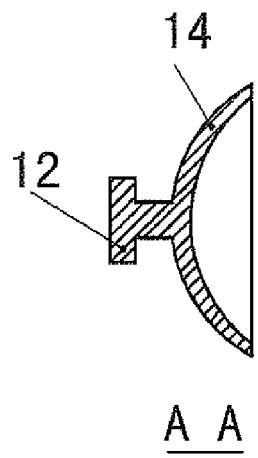

A combined apparatus of a phone holder and a wireless earset according to the invention will be described below with reference to the accompanying drawings.

FIGS. 1(a) to 1(d) are schematic diagrams showing a phone holder of a first embodiment of a combined apparatus of a phone holder and a wireless earset according to the invention. Reference numeral 1 denotes a phone holder, reference numeral 2 denotes a backplate of the phone holder 1, reference numeral 3 denotes a bottom plate of the phone holder 1, and reference numerals 4 and 5 denote a left holding arm and a right holding arm of the phone holder 1 respectively. In this way, a mobile phone can be put on the bottom plate 3 erectly, rest against the backplate 2, and be sandwiched by the left holding arm 4 and the right holding arm 5 therebetween, thus the mobile phone will not drop out or slide out. Reference numeral 9 denotes a connection member for the holding arms and the backplate. Reference numeral 6 denotes a mounting structure for fixing the phone holder inside an automobile, and it is an inserting groove herein, and reference numeral 6' denotes an enlarged portion of the inserting groove, so that an inserting head of a clamping clip or a suction cup for fixation enters into the inserting groove. A cavity 7 for accommodating an earphone of an earset is provided at the top of the left holding arm 4. Reference numeral 8 denotes a notch for receiving a neck of the earphone. It is shown in FIGS. 1(c) and 1(d) that the cavity 7 is only provided on the left holding arm 4. It goes without saying that the cavity 7 can also be provided on the right holding arm 5 or the cavity 7 (not shown in the figures) can be provided on both of the left and right holding arms. Also, an aesthetic pattern, a trademark and characters can be molded or printed on exposed surfaces of the phone holder and the earset.

FIGS. 2(*a*) to 2(*c*) show a clamping clip and a suction cup for fixing the phone holder at an appropriate position in the automobile. These parts are of a known art (for example, refer to the Chinese patent application No. 200620007536.7 owned by the applicant). Reference numeral 10 denotes a clamping clip, reference numeral 11 denotes a suction cup, and reference numeral 12 denotes an inserting head. Reference numeral 13 denotes clamping teeth and reference numeral 14 denotes a body of the suction cup made of soft plastics.

Figure 3:
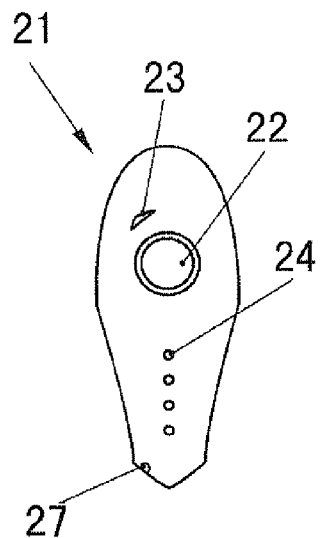
Figure 3:
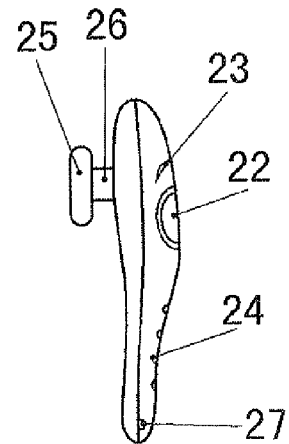

In FIGS. 3(*a*) and 3(*b*), reference numeral 22 denotes a switch button, reference numeral 23 denotes a switch indicator, and reference numeral 24 denotes an electric quantity indicator of a built-in battery. Reference numeral 25 denotes an earphone which matches ears of an ordinary person. When the earphone is inserted into ears, the whole earset 21 can be hung near ears. Reference numeral 26 denotes a neck of the earphone and reference numeral 27 denotes a microphone.

Figure 4:
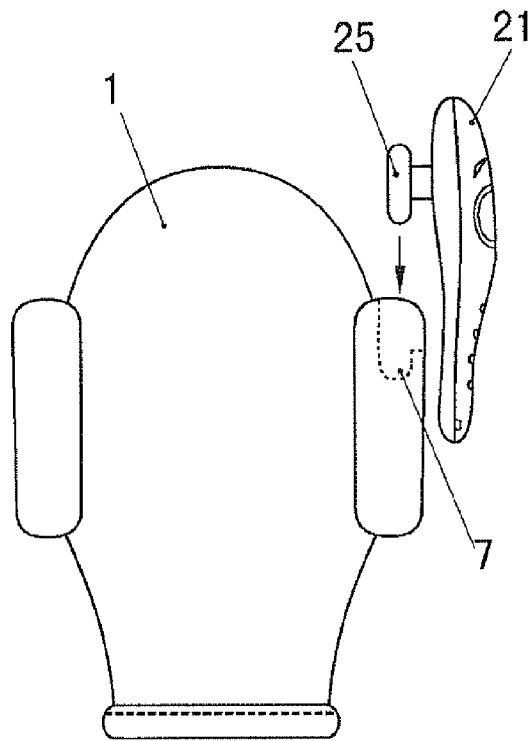
FIGS. 4(a) to 4(c) are schematic diagrams showing an assembling manner of the first embodiment of the combined apparatus of a phone holder and a wireless earset according to the invention.
Figure 4:
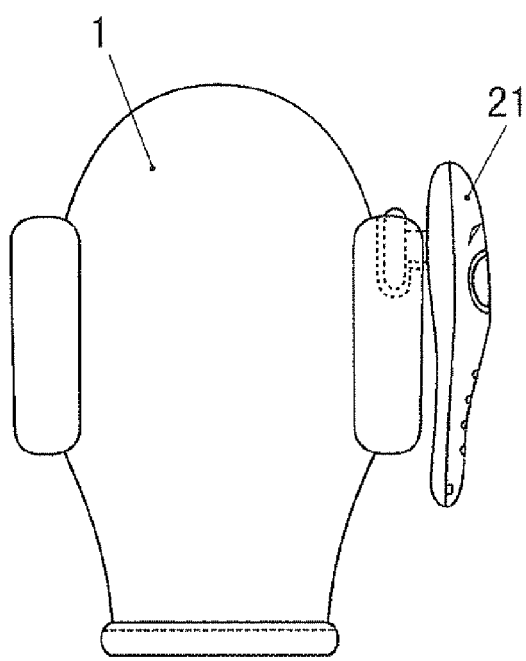

FIGS. 4(*a*) to 4(*c*) are combined diagrams showing that the earset 21 is held to a holding arm of the phone holder 1 when a call is not made. FIG. 4(*a*) shows a state in which the earphone 25 is located above the holding arm and is ready to be put into the cavity 7. FIG. 4(*b*) shows a state in which the earphone 25 has already been put into the cavity 7. FIG. 4(*c*) is a side view of FIG. 4(*b*).

In FIG. 5(*a*), a backplate 2' of a phone holder 31 has an expansion portion 32, and a power source conversion device which converts a direct current power source of 12 V in an automobile into a power source required to charge the wireless earset 21' as an output is provided within a space expanded by the expansion portion. Two electric contacts which supply power to the earset are provided at the outer side of a holding arm 4' with a cavity 7, while an electric contact for charging the earset is also provided at a corresponding location on the face of the earphone 25 of the earset 21'.

Reference numeral 34 denotes a plug for connection with a power supply in the automobile and reference numeral 33 denotes a conductor output to the power source conversion device. Reference numeral 35 denotes an output conductor of the power supply after the conversion, which is then joined into the holding arm 4', and two electric contacts 36 and 36' are left at appropriate positions on the outer side of the holding arm.

FIG. 5(*b*) shows that two electric contacts which supply power to the earset are provided at the outer side of a holding arm 4' with a cavity 7, while an electric contact for charging the earset 21' is also provided at a corresponding location on the face of the earphone 25 of the earset 21'. Electric contacts 37 and 37' for power output are also provided at corresponding locations on the face (front face) of the earphone 25 of the earset 21'.

It is known from FIGS. 5(*a*) and 5(*b*) that the electric contacts 37 and 37' on the wireless earset 21' are in contact with the electric contacts 36 and 36' on the holding arm 4' correspondingly when the earset 21' is hung on the holding arm 4' as shown in FIGS. 4(*a*) to 4(*c*) (that is, when the earphone 25 is put in the cavity 7). The effect thus obtained is that when a call is not made and is hung up, that is, the earset 21' is hung on the holding arm 4', a battery in the earset 21' is charged so that power is replenished.

In FIG. 6, a port (for example, a USB port) capable of receiving in a wired manner and storing external information is additionally provided in a wireless earset and a cap which can be removed or re-capped is provided at an upper end of the wireless earset. When the cap is removed, a wired contact slot of the USB port is exposed to outside. At the same time, a button which can operate and playback the stored information is provided at an appropriate location of the casing of the earset. For example, a cap 42 which can be removed or re-capped is provided at an upper end of the earset 41. A port (for example, a USB port) capable of receiving in a wired manner and storing external information is further provided in the wireless earset 41. When the cap 42 is removed and the contact slot 43 of the USB port is exposed, the USB port can be connected to a corresponding socket of a computer to transfer information. In the meanwhile, in order to operate and playback the stored information, a number of operation buttons 44 can be provided at an appropriate location of a casing of the earset 41.

Figure 7:
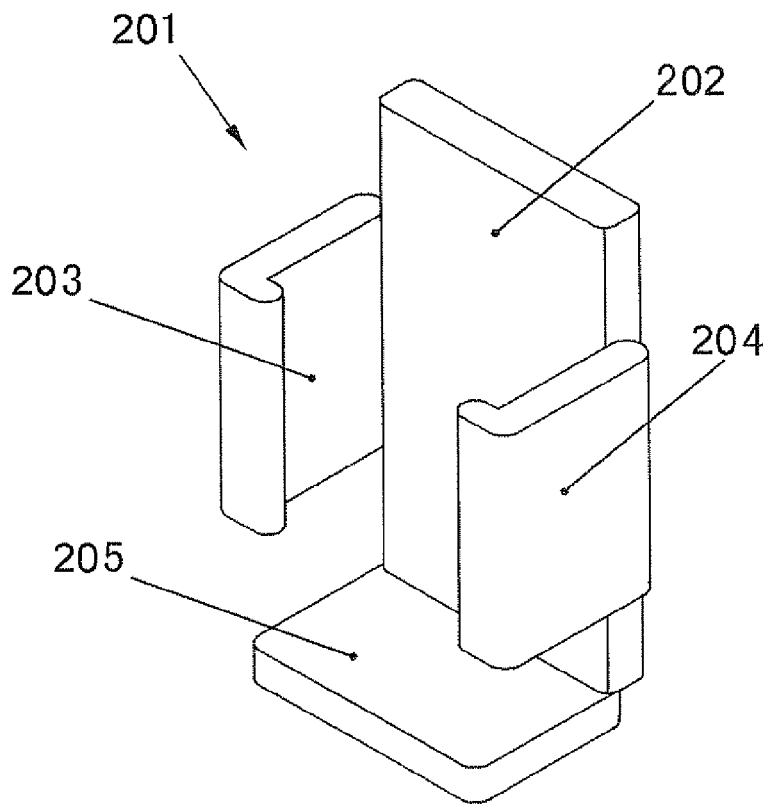
Figure 7:
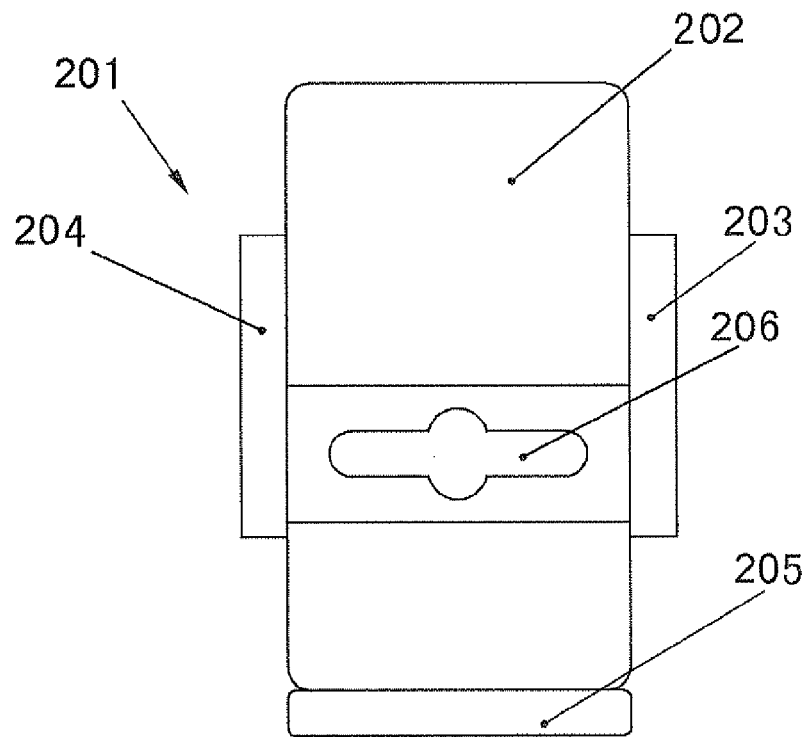
Figure 7:
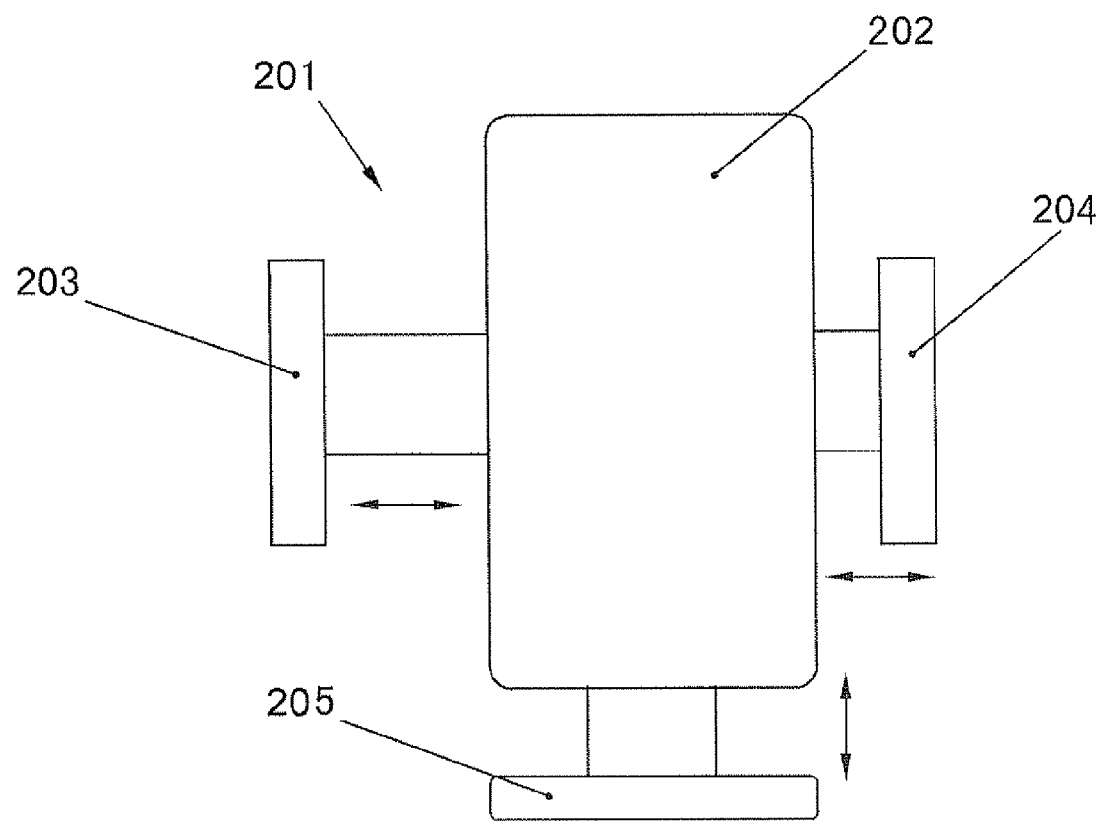

FIGS. 7(*a*) to 7(*c*) show a general structure and feature of a phone holder of a second embodiment of a combined apparatus of a phone holder and a wireless earset according to the invention.

In FIG. 7(*a*), reference numeral 201 denotes a phone holder, reference numeral 202 denotes a backplate, reference numeral 203 denotes a left holding arm, reference numeral 204 denotes a right holding arm, and reference numeral 205 denotes a bottom plate. FIG. 7(*a*) shows a basic form of the phone holder and does not show that a holding device for holding a wireless earset is attached to the phone holder 201. The holding device can be attached to an appropriate position on the backplate 202, the left holding arm 203 or the right holding arm 204 as shown in the following relevant drawings.

In FIG. 7(*b*), reference numeral 206 denotes an inserting groove which fixes the phone holder at an appropriate position in an automobile. The inserting groove 206 is used to insert-hold the clamping clip 10 or the suction cup 11.

In FIG. 7(*c*), there is drawn one bidirectional arrow near the left holding arm 203, the right holding arm 204 and the bottom plate 205 respectively. These arrows indicate that these parts respectively have such a structure (for example, a device like a slide chute or a slide rail, not shown in the figures) that they can be pulled out or pushed in from/to the bottom portion or the side portion of the backplate 202, in order to regulate a width between the two holding arms or an effective height of the backplate so that the phone holder is suitable for the mobile phones with different sizes to be placed thereon. Specifically, the bottom plate of the phone holder can be pulled out or pushed in from/to the bottom portion of the backplate to regulate a height of the phone holder, and the left holding arm and the right holding arm of the phone holder can be pulled out or pushed in from/to the side portion of the backplate to regulate a width of the phone holder.

In the above description, only the "basic form" of the phone holder is shown, that is, a "combined apparatus" has not been formed by the phone holder together with the wireless earset, and the holding device for holding the wireless earset has not been fabricated at an appropriate location of the left holding arm 203 or the right holding arm 204 or the backplate 202 of the phone holder.

Figure 8:
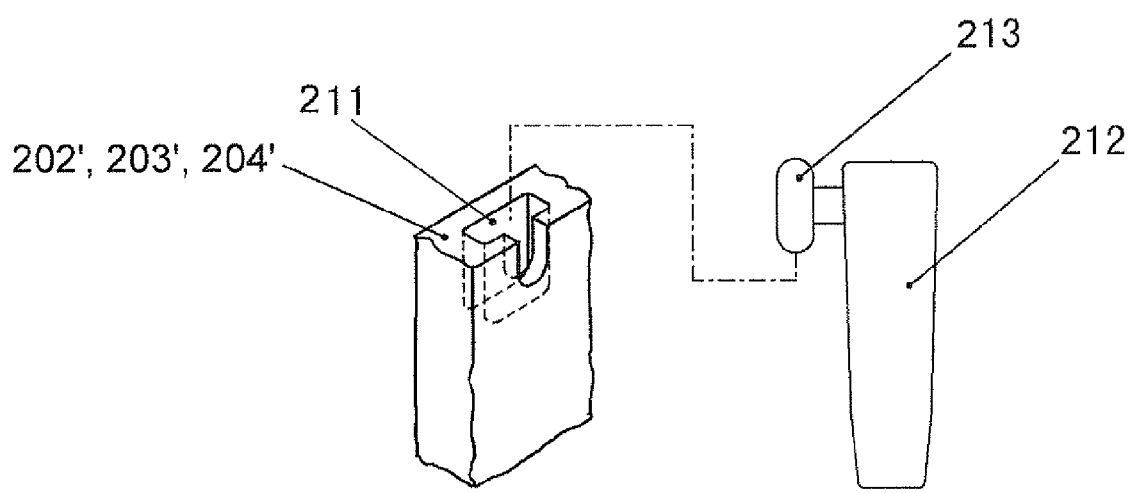
FIGS. 8(a) to 8(e) are schematic diagrams showing the second embodiment of the combined apparatus of a phone holder and a wireless earset according to the invention, which indicate that the apparatus has a holding device for holding the wireless earset in diverse variable manners.
Figure 8:
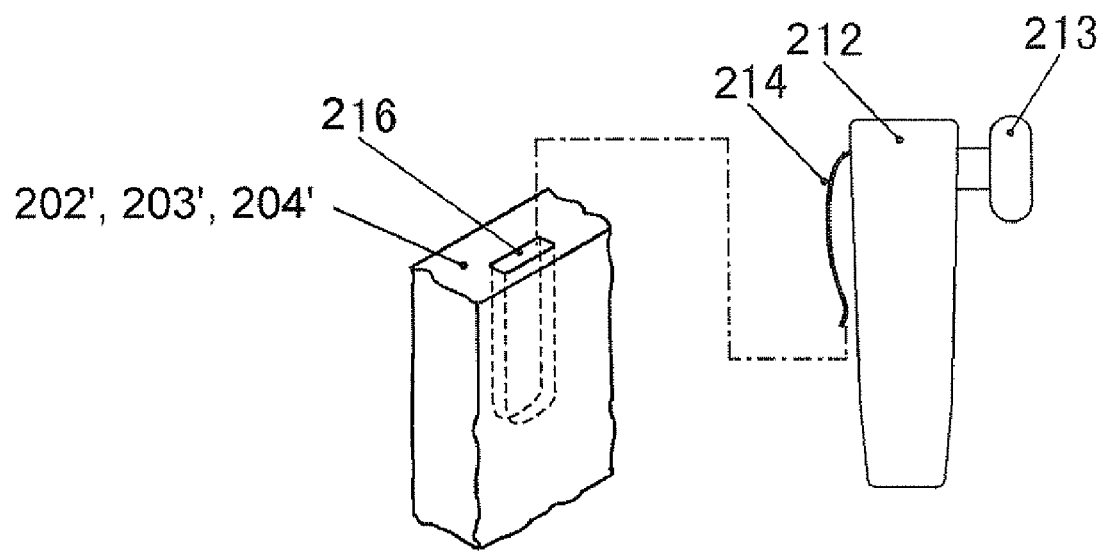
Figure 8:
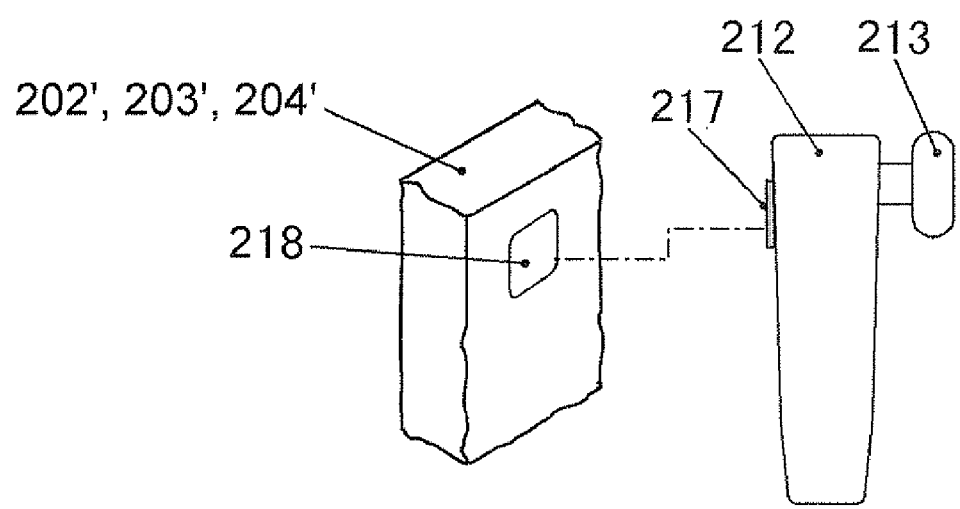
Figure 8:
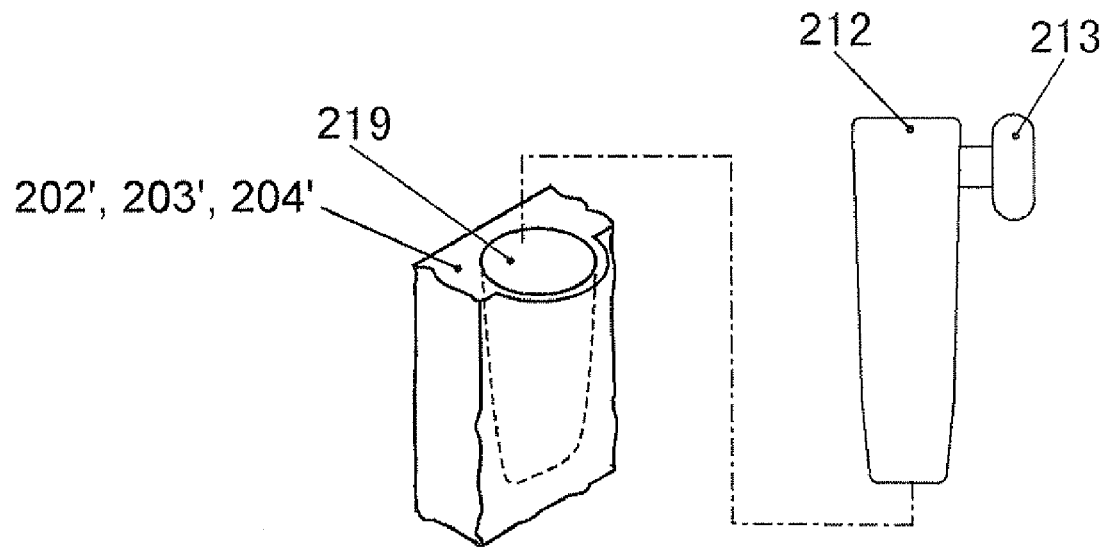
Figure 8:
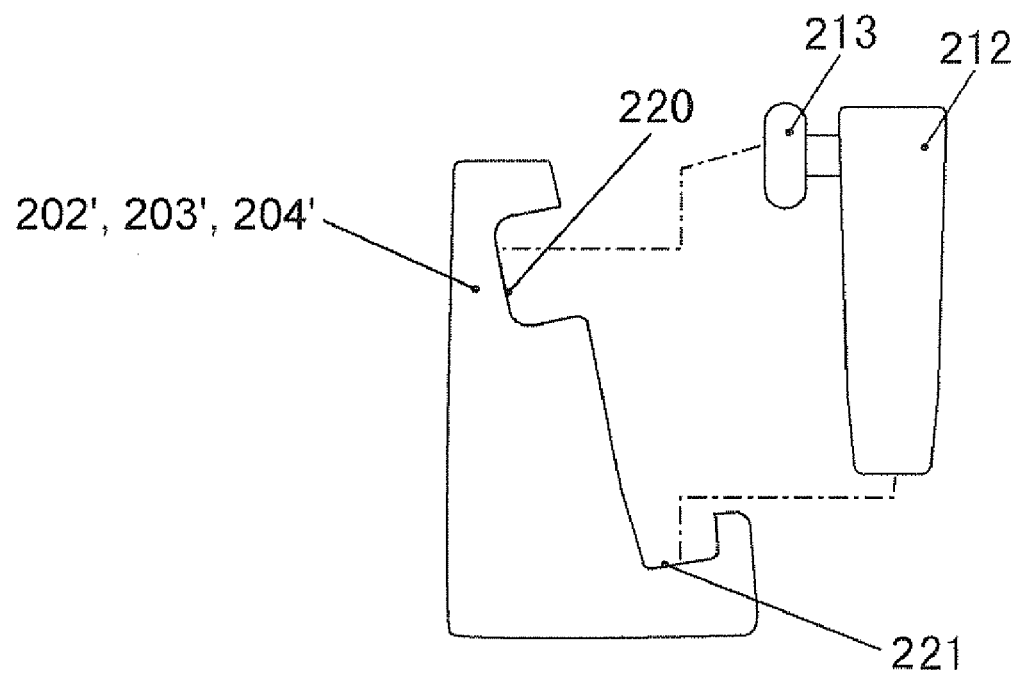

In FIGS. 8(*a*) to 8(*e*), the holding device for holding the wireless earset is provided at an appropriate position of the backplate 202 or the left holding arm 203 or the right holding arm 204 of the phone holder 201. For the purpose of clear and simple illustration, the relationship how the holding device and the wireless earset are used cooperatively with each other is shown by the portions cut away from the "appropriate position" of such part as the backplate 202 or the left holding arm 203 or the right holding arm 204 of the phone holder 201. Actually, the holding device is directly provided at the appropriate position of the backplate 202 or the left holding arm 203 or the right holding arm 204 of the phone holder 201 as an entirety, and it is not necessary that the portions are shown by cut them away from the "appropriate position" of such part as the backplate 202 or the left holding arm 203 or the right holding arm 204 of the phone holder 201. Reference numeral 202' denotes a portion cut away from the "appropriate position" of the backplate 202 where the holding device is disposed, reference numeral 203' denotes a portion cut away from the "appropriate position" of the left holding arm 203 where the holding device is disposed, and reference numeral 204' denotes a portion cut away from the "appropriate position" of the right holding arm 204 where the holding device is disposed.

In FIG. 8(a), the holding device is a cavity 211 for accommodating an earphone 213 of a wireless earset 212 fabricated at the appropriate position. The cavity 211 is shaped and sized so that the earphone 213 drops into the cavity exactly so that the wireless earset is hung at the position and is fixed. Wherein, the holding device for holding the wireless earset is shaped to match the wireless earset, and has a cavity which can accommodate the earphone of the wireless earset.

FIG. 8(b) shows that a holding clip 214 like a pen clip is provided on the wireless earset 212, in addition to the earphone 213. A cavity 216 for accommodating the holding clip 214 is provided in the portions denoted by reference numerals 202', 203' or 204' cut away from the "appropriate positions" of the respective parts. The cavity 216 is shaped and sized so that the holding clip 214 is accommodated exactly. The holding clip 214 is allowed to enter the cavity 216 and secured by it, thus the wireless earset 212 can be fixed at the position. Wherein, a holding clip like a pen clip is also provided on the wireless earset, and the holding device for holding the wireless earset has a cavity shaped and sized so that the holding clip can be accommodated exactly.

FIG. 8(c) shows that one magnetic sheet 217 is adhered to the wireless earset 212, in the meanwhile, one magnetic sheet 218 with a polarity opposite to that of the magnetic sheet 217 is also adhered to the portions denoted by reference numerals 202', 203' or 204' cut away from the "appropriate positions" of the respective parts. By making the magnetic sheets 217 and 218 approach each other, the wireless earset 212 can be attracted at the position and fixed by a magnetic force. Wherein, the holding device for holding the wireless earset is formed by adhering one magnetic sheet to an outer surface of the wireless earset and adhering another matching magnetic sheet to a corresponding outer surface of the phone holder.

In addition, in FIG. 8(c), if reference numeral 217 is changed as denoting one piece of adhered Velcro (also referred to as a loop-hook Nylon fastener) and reference numeral 218 is changed as denoting another piece of adhered Velcro corresponding to the Velcro 217. The wireless earset can be fixed at the position by virtue of mutual adherence of the pair of Velcros 217 and 218. Wherein, the holding device for holding the wireless earset is formed by adhering one piece of Velcro to an outer surface of the wireless earset and adhering another piece of matching Velcro on a corresponding outer surface of the phone holder.

FIG. 8(d) shows that an expanded cavity 219 is fabricated in the portions denoted by reference numerals 202', 203' or 204' cut away from the "appropriate position" of the backplate 202 or the left holding arm 203 or the right holding arm 204 of the phone holder. The cavity is shaped and sized so that it matches the lower portion of the wireless earset 212 and has a depth which exceeds about a half of the height of the wireless earset. Thus, a body of the wireless earset 212 can be put into the cavity 219 and fixed. Wherein, the holding device for holding the wireless earset is an expanded cavity which is provided at an appropriate location of the phone holder, and the cavity is shaped and sized to match the lower portion of the wireless earset to accommodate the wireless earset.

FIG. 8(e) shows that two cavities, i.e., one upper cavity 220 and one lower cavity 221 are fabricated in the portions denoted by reference numeral 202', 203' or 204' cut away from the "appropriate positions" of the backplate 202 or the left holding arm 203 or the right holding arm 204 of the phone holder. These two cavities are shaped and sized such that they match the earphone 213 and the lower end of the wireless earset 212 respectively. Thus, the earphone 213 can be allowed to enter into the cavity 220, and the lower end of the earset to enter into the cavity 221 and be fixed. Wherein, the holding device for holding the wireless earset includes two cavities, one of the cavities is shaped to match the earphone of the wireless earset and can accommodate the earphone, and the other of the cavities is shaped to match the lower end of the wireless earset and can accommodate the lower end.

The "appropriate position" or the "appropriate location" may be set to a position of the backplate or the left holding arm or the right holding arm of the phone holder convenient for a user to operate, for example, a top portion, a side portion, an upper half portion, an upper portion, a middle portion, a lower middle portion, a lower portion, an upper left half portion, an upper left portion, a left middle portion, a lower left middle portion, a lower left portion, an upper right half portion, an upper right portion, a right middle portion, a lower right middle portion, a lower right portion or the like of the backplate or the left holding arm or the right holding arm of the phone holder (not shown in the figures).

The diverse manners of fixing the wireless earset at the respective locations (i.e. the backplate 202 or the left holding arm 203 or the right holding arm 204) of the phone holder are shown above. Needless to say, those skilled in the art can make other variations in accordance with the principle inspired by the above manners.

Figure 9:
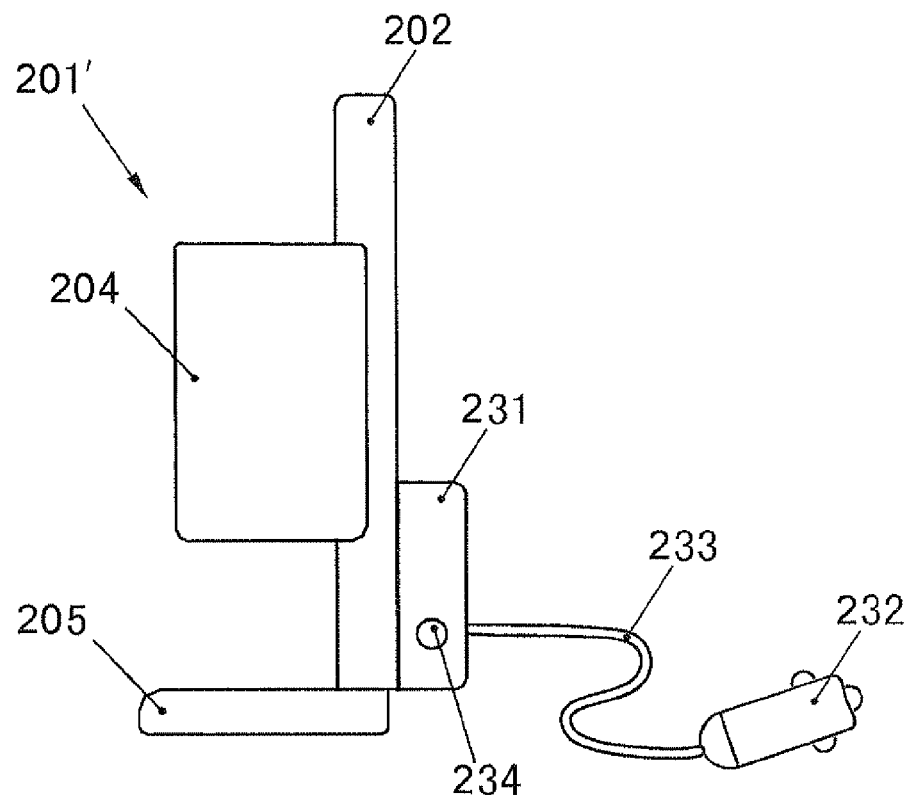
FIG. 9 is a schematic diagram showing the second embodiment of the combined apparatus of a phone holder and a wireless earset according to the invention, in which a power source device for recharging the wireless earset is provided on the phone holder.

In FIG. 9, reference numeral 201' denotes a phone holder and reference numeral 231 denotes an expansion portion added to an appropriate location of the backplate 202 (certainly, the expansion portion 231 can also be not attached to the backplate 202, but be attached to an appropriate location of the left holding arm 203 or the right holding arm 204, not shown in the figure). A device which converts a direct current source of 12 V in an automobile into a power source suitable for the wireless earset is provided within the expanded space. Reference numeral 232 denotes a plug for connection to the direct current power source of 12 V in the automobile and reference numeral 233 denotes a conductor. An output end of the power source is provided with two electric contacts which are provided at a corresponding position where the wireless earset is fixed (not shown in FIG. 9, see the part designated by reference numeral 241 in FIGS. 10(a) to 10(e)). Reference numeral 234 in FIG. 9 denotes a power source plughole. When the direct current power source of 12 V in the automobile is not used, for example, when the wireless earset is used at home or in office, a power source conversion device (not shown in the figure) can be connected to an alternating current power source of 100 V~240 V to generate a power source suitable for the wireless earset, and the wireless earset can be energized and recharged in a way that the plug is inserted in the power source plughole 234. And, two electric contacts for supplying power to the wireless earset are provided at appropriate locations on the surface of the holding device for holding the wireless earset of the phone holder, at the same time, other two electric contacts for recharging the wireless earset are also provided at corresponding locations on the outer surface of the wireless earset. Wherein, a plughole which can be connected to a power source suitable for the wireless earset which is converted from an alternating current source of 100 V~240 V is provided on the phone holder, and the inside end of the plughole is connected to the electric contacts which are on the phone holder and for recharging the wireless earset.

In FIGS. 10(a) to 10(e), for the purpose of clear illustration, the relationship how the holding device and the wireless earset are used cooperatively with each other is shown by the portions 202', 203' or 204' cut away from the "appropriate position" of such part as the backplate 202 or the left holding arm 203 or the right holding arm 204 of the phone holder 201'. Actually, the holding device is directly provided at the appropriate position of the backplate 202 or the left holding arm 203 or the right holding arm 204 of the phone holder 201' as an entirety, and it is not necessary that the portions are shown by cut them away from the "appropriate position" of such part as the backplate 202 or the left holding arm 203 or the right holding arm 204 of the phone holder 201'. Reference numeral 202' denotes a portion cut away from the "appropriate position" of the backplate 202 where the holding device is disposed, reference numeral 203' denotes a portion cut away from the "appropriate position" of the left holding arm 203 where the holding device is disposed, and reference numeral 204' denotes a portion cut away from the "appropriate position" of the right holding arm 204 where the holding device is disposed.

In FIGS. 10(a) to 10(e), the wireless earset 212' is different from the wireless earset 212 in that a pair of electric contacts 242 which receive power from the phone holder 201' to be recharged are provided at appropriate locations of a housing of the wireless earset 212'. At the same time, a pair of power electric contacts 241 are fabricated on the portions 202', 203' or 204' cut away from the "appropriate position" of such part as the backplate 202 or the left holding arm 203 or the right holding arm 204. When the wireless earset 212' is attached to the phone holder 201' in different manners (inserted in the cavities in FIGS. 10(a), 10(b), 10(d) and 10(e) and adhered with each other by magnetic sheets or Velcros in FIG. 10(c)), the pair of electric contacts 241 are connected to the pair of electric contacts 242 provided on the housing of the wireless earset 212' to recharge the wireless earset 212'.

Figure 10:
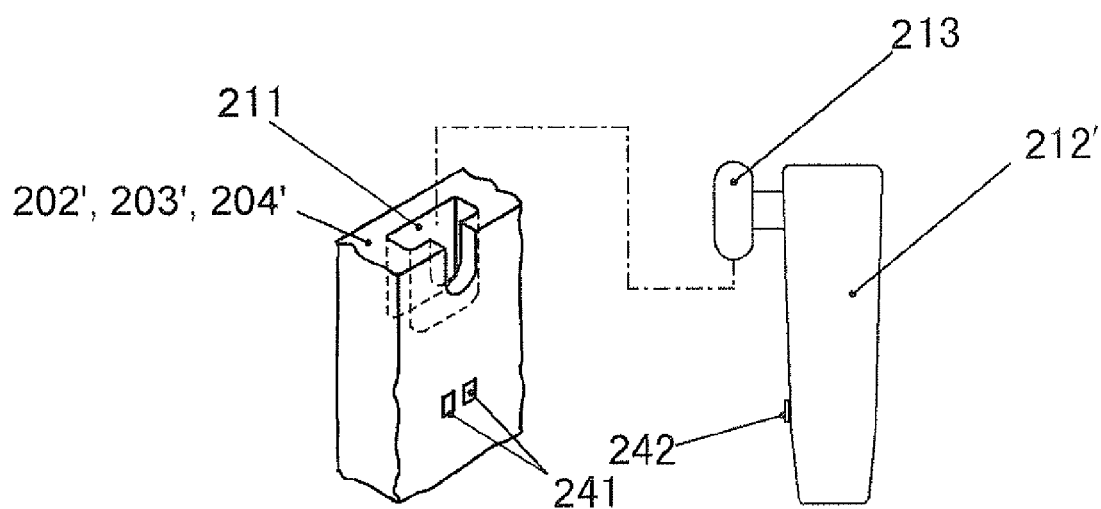
FIGS. 10(a) to 10(e) are schematic diagrams showing the second embodiment of the combined apparatus of a phone holder and a wireless earset according to the invention, in which the holding device holding the wireless earset in diverse variable manners and having a recharging function is included in the apparatus.
Figure 10:
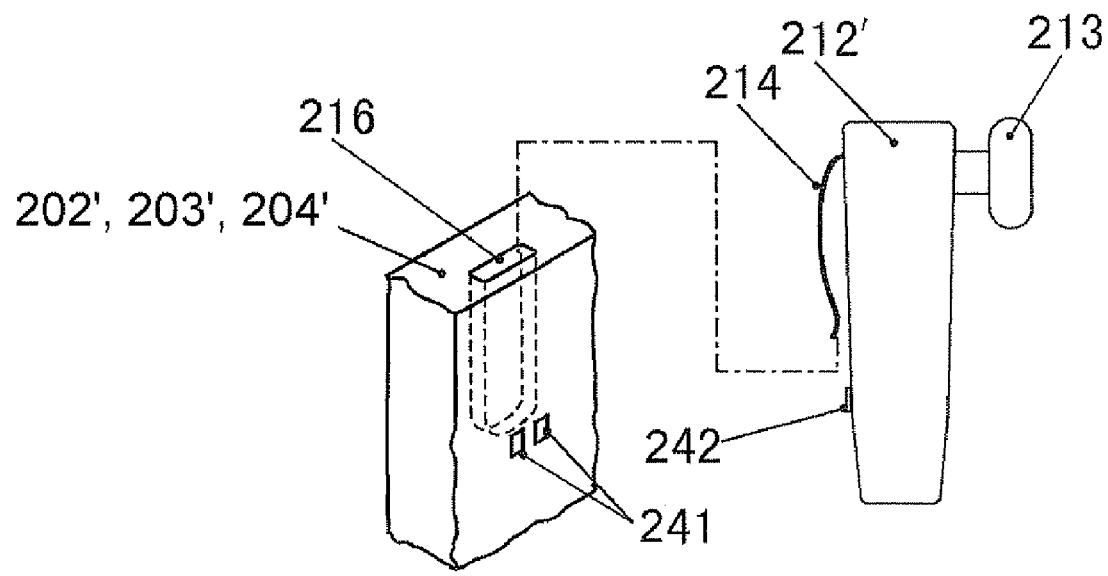
Figure 10:
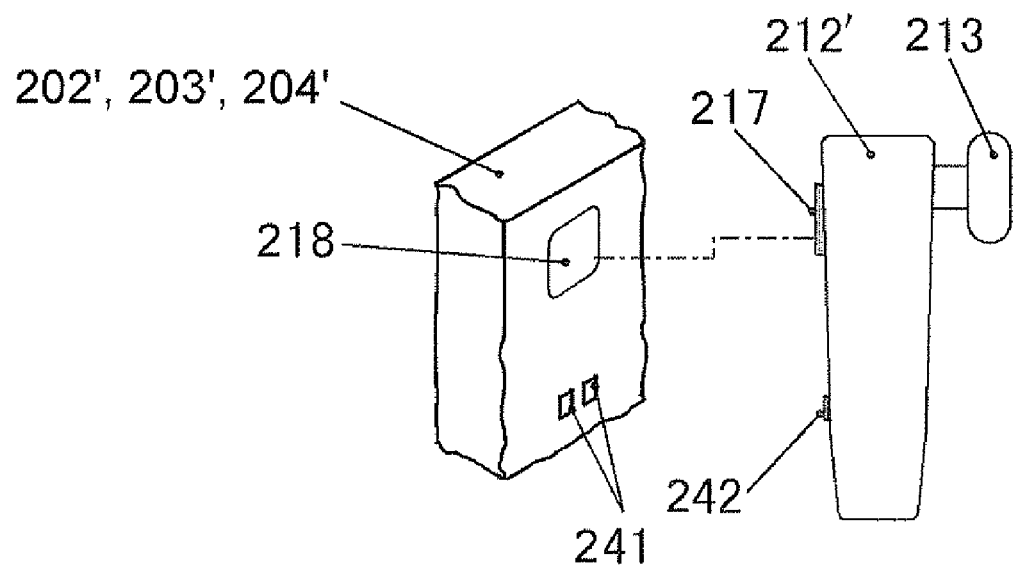
Figure 10:
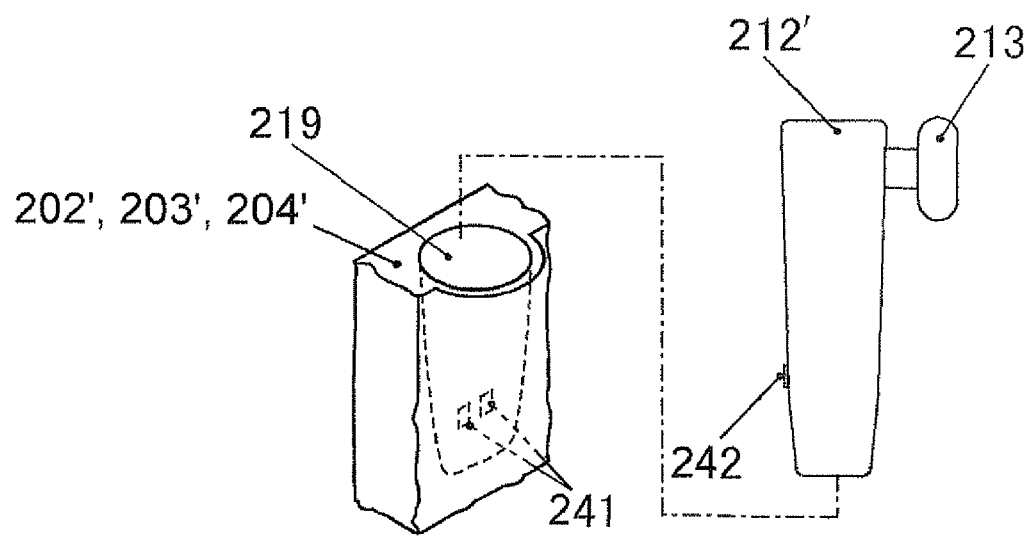
Figure 10:
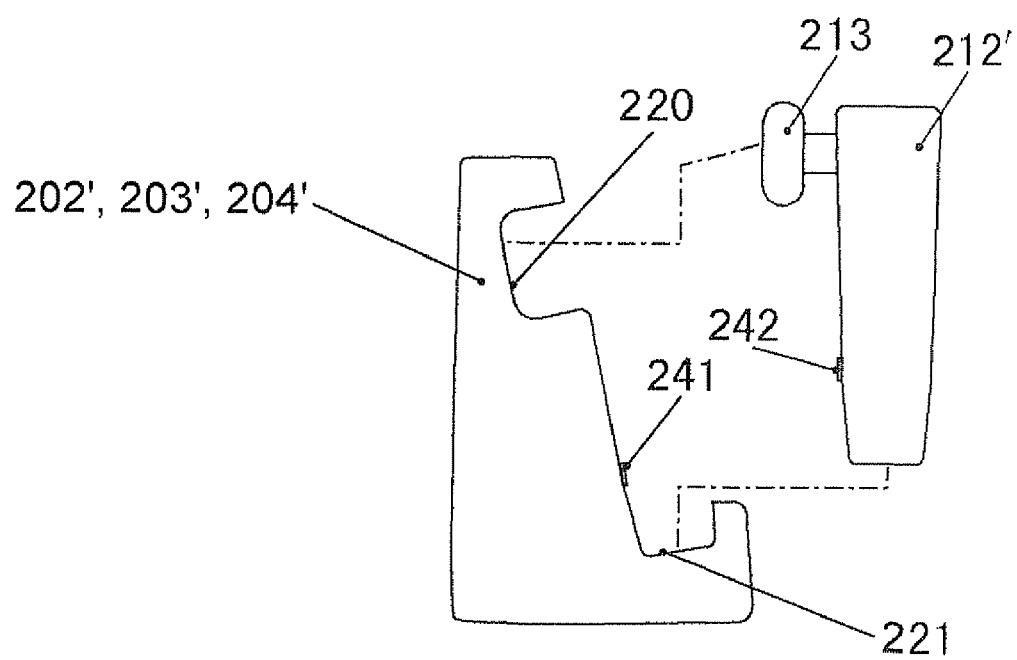

In FIG. 10(d), the electric contacts 241 are provided on the surface of the cavity 219. When the lower portion of the wireless earset 212' is seated in the cavity 219, the electric contacts 242 provided on the housing of the wireless earset 212' are connected to the pair of electric contacts 241 in the cavity 219.

Two electric contacts for supplying power to the wireless earset are provided at appropriate locations on the surface of the holding device for holding the wireless earset of the phone holder, at the same time, other two electric contacts for recharging the wireless earset are also provided at corresponding locations on the outer surface of the wireless earset. Wherein, a plughole which can be connected to a power source suitable for the wireless earset which is converted from an alternating current source of 100 V~240 V is provided on the phone holder, and the inside end of the plughole is connected to the electric contacts which are on the phone holder and for recharging the wireless earset.

Figure 11:
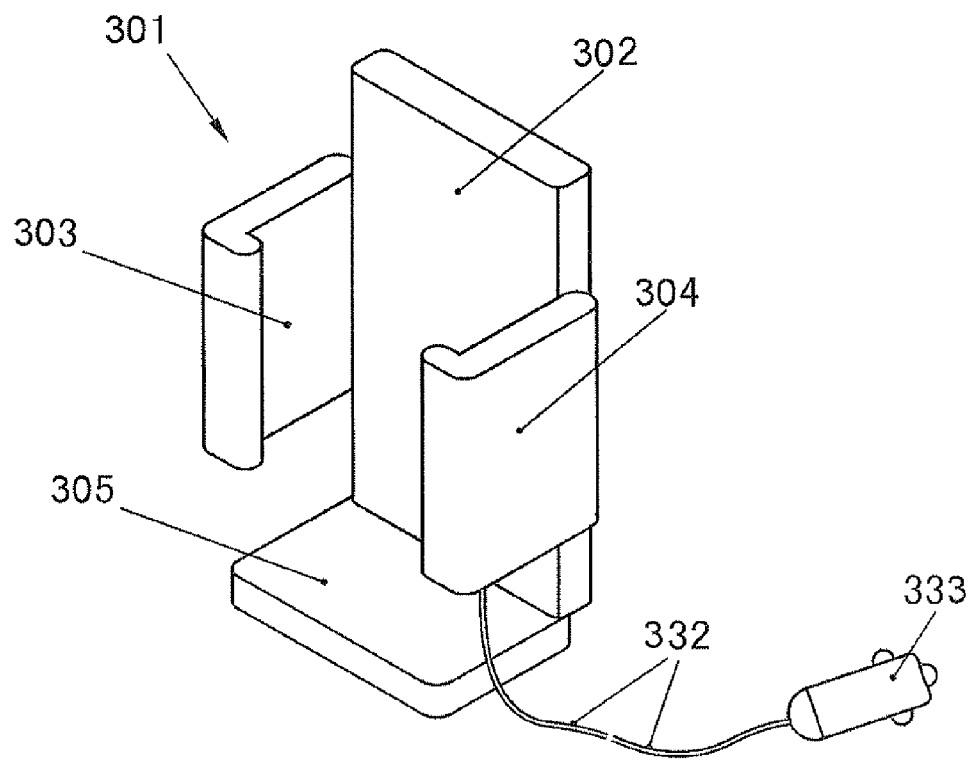
FIG. 11 is a schematic diagram showing a basic form of a phone holder of a third embodiment of a combined apparatus of a phone holder and a wireless earset according to the invention, in which the phone holder is not attached with related holding device.

FIG. 11 shows a basic form of a phone holder 301 of the third embodiment of a combined apparatus of a phone holder and a wireless earset according to the invention, in which a holding device for holding the wireless earset has not been attached to the phone holder. Reference numeral 302 denotes a backplate of the phone holder 301, reference numerals 303 and 304 denote a left holding arm and a right holding arm of the phone holder 301 respectively, and reference numeral 305 denotes a bottom plate of the phone holder 301. A mounting structure for fixing the phone holder in an automobile can be provided on the back face of the backplate 302 (not shown in the figure). Reference numeral 332 denotes a conductor led out from the phone holder when the phone holder has a function of charging the wireless earset, and the conductor 332 extends to be connected to a plug 333 which is inserted into a plughole of the direct current power source of 12 V in the automobile.

Figure 12:
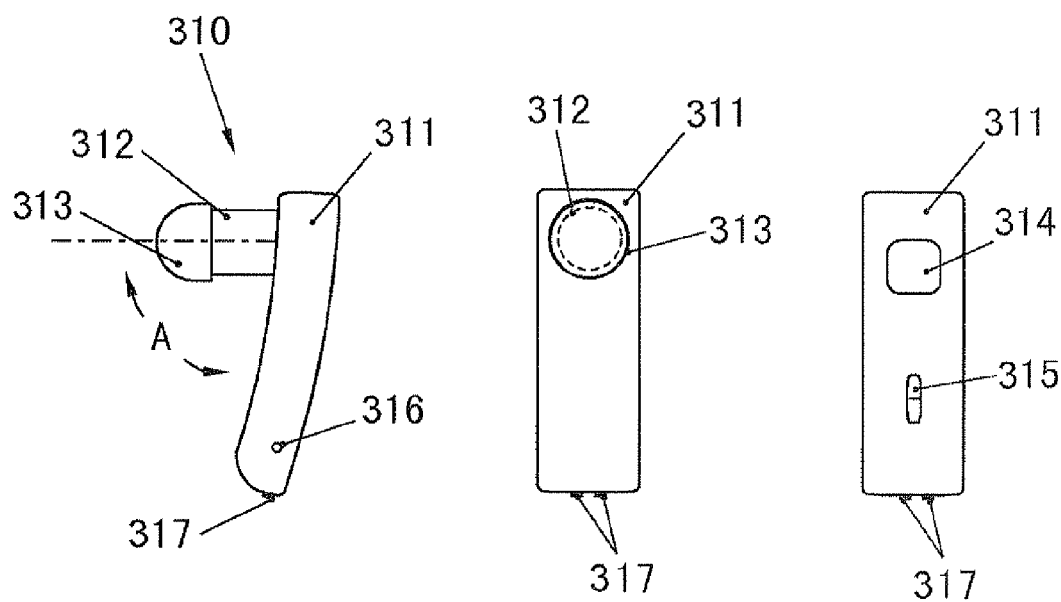

In FIGS. 12(a) to 12(c), reference numeral 310 denotes a wireless earset, reference numeral 311 denotes a casing (with a microphone therein), reference numeral 312 denotes a neck of an earphone, reference numeral 313 denotes a head of the earphone, wherein a housing of the head is made of a soft material so that the head can be inserted into and held in the earhole of the user for the user to listen the voice. Reference numeral 316 denotes a power source plughole when an alternating current source of 100 V~240 V is converted into a power source suitable for the earset (not shown in the figures) when the earset is not used in the automobile, so that the wireless earset can be charged. Two electric contacts 317 are provided at the bottom of the casing 311, and when the earset is used in the automobile, the earset is insert-held in the holding device for the wireless earset of the invention, so that the earset is energized and recharged. An axis of the neck 312 of the earphone and a longitudinal axis of the casing 311 form an angle A, which is generally an arbitrary angle, preferably 70°~90°, so that after the earphone is inserted into earholes, the casing 311 can be in close fitting with ears and face comfortably.

FIG. 12(a) shows a side face of the wireless earset 310.

FIG. 12(b) shows a front face (i.e., the face where the earphone head is located) of the wireless earset 310.

FIG. 12(c) shows a back face (i.e., the face back away from the earphone head) of the wireless earset 310, reference numeral 314 denotes a switch button, and reference numeral 315 denotes a volume button.

In FIGS. 13(a) to 13(c), the right holding arm 304 of the phone holder is refabricated into a right holding arm 304' shown in the figures. An upper holding cavity 320 and a lower holding pan 322 for fixing the wireless earset 310 are provided at the outer side of the right holding arm 304', and a U-shaped opening of the upper holding cavity 320 faces downward. The upper holding cavity 320 in FIG. 13(a) is reversed in FIG. 13(b), in order to show the shape and configuration thereof more clearly. It can be seen from this that the upper holding cavity 320 is an inverted U-shaped groove, shaped, angled and sized to match the neck 312 of the earphone, and is lined with a layer of elastic soft material 321 (for example, foam rubber). The lower holding pan 322 is a very shallow pan, and shaped, angled and sized to match the lower end of the wireless earset 310, and two electric contacts 323 corresponding to electric contacts 317 are provided at the bottom of the pan (see FIG. 13(c)). The electric contacts 323 are connected to the conductor 332 as shown in FIG. 11 through a power source conversion device (which converts the direct current source of 12 V of the automobile into the power source suitable for the wireless earset) built in the phone holder.

When it is required to fix the wireless earset 310 at the position, first, the neck 312 of the earphone is held to the soft material 321 of the inverted U-shaped groove, the soft material 321 is pressed due to the upward pushing force, then the lower end of the wireless earset 310 is elevated so as to step across the edge of the lower holding pan 322 and enter into the lower holding pan. After the pushing force is released, the lower end is seated into the lower holding pan 322 and fixed due to the resilient force of the elastic soft material 321, and the electric contacts 317 are electrically connected to the electric contacts 323 at the same time, so that the wireless earset can be recharged (see FIG. 15(a)).

As described above, the holding device is realized by refabricating the original right holding arm 304 into the right holding arm 304'. Obviously, if required, the holding device can also be realized by refabricating the left holding arm 303 or the backplate 302 in this way (not shown in the figures).

In FIGS. 14(a) and 14(b), the right holding arm 304 is refabricated into a right holding arm 304" as shown in the figures. An upper holding cavity 320' and a lower holding pan 322' for fixing the wireless earset 310 are provided at the outer side of the right holding arm 304", and a U-shaped opening of the upper holding cavity 320' faces upward, shaped, angled and sized to match the neck 312 of the earphone, and is lined with a U-shaped clip 321' (or the layer of elastic soft material 321) which can be made of an elastic thin sheet metal or semi hard plastics. Reference numeral 325 denotes a holding space therein. FIG. 14(b) shows the shape and the configuration of the U-shaped clip 321' separately. Retracted waist portions 324 are provided at both sides of the U-shaped clip respectively, so that when the neck 312 of the earphone is pressed downward, the neck can squeeze the waist portions 324 at both sides apart and be seated into the holding space, thereby to be held and fixed therein by the elastic force. Reference numeral 322' in the figure denotes a lower holding pan of the right holding arm 304", the configuration and the action of the lower holding pan 322' are similar to those of the lower holding pan 322 in FIG. 13(a), and the description thereof is omitted herein. In use, the neck 312 of the earphone of the wireless earset 310 is placed on the U-shaped clip 321' and the lower end of the earset is aligned with the lower holding pan 322', then, the earset is pressed downwardly, so that both the upper portion and the lower portion of the earset are held, while the electric contacts 317 and the electric contacts 323 are connected and recharging is performed. Similarly, if required, the holding device can also be provided on the left holding arm 303 or the backplate 302 (not shown in the figures).

Figure 15:
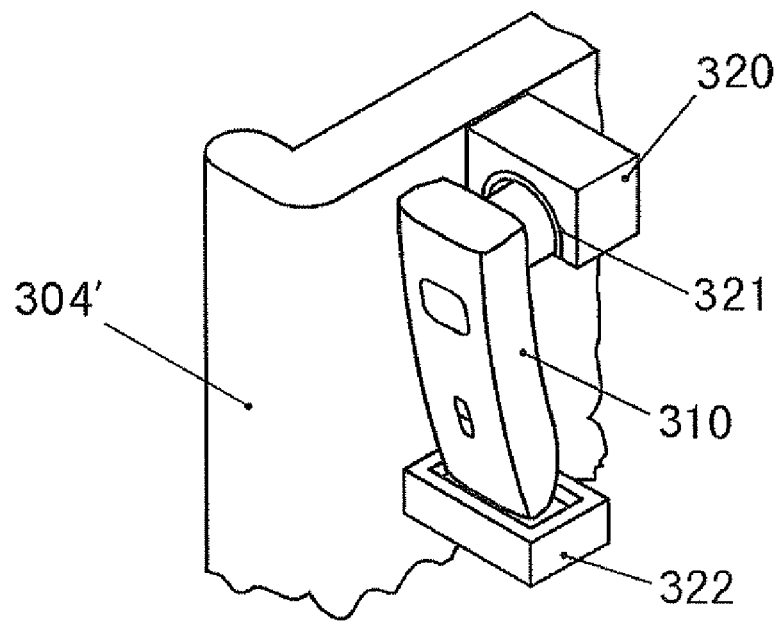
FIGS. 15(a) and 15(b) are schematic diagrams respectively showing the third embodiment of the combined apparatus of a phone holder and a wireless to earset according to the invention, which show the states in which the wireless earset is insert-held to the holding devices shown in FIGS. 13(a) and 14(a) respectively.
Figure 15:
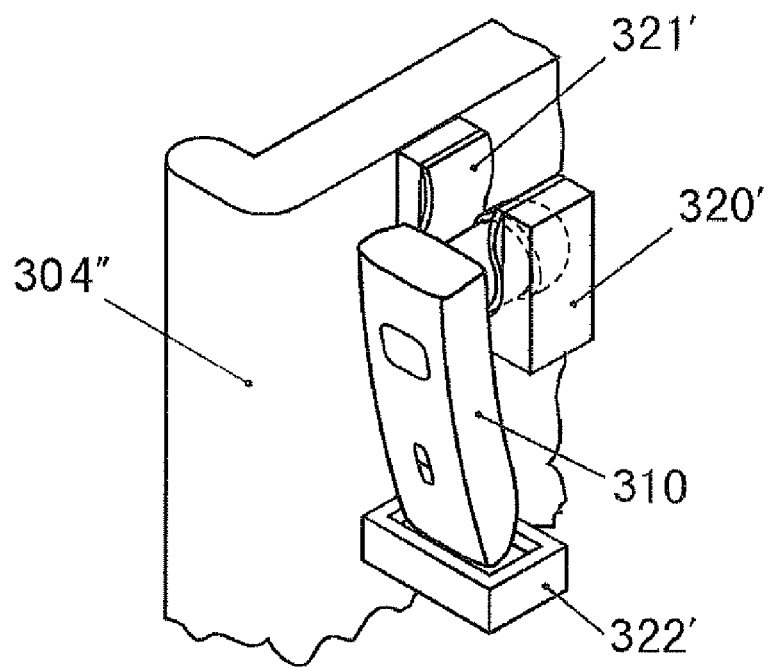

FIGS. 15(a) and 15(b) are schematic diagrams showing the states in which the wireless earset 310 of the third embodiment of the invention is insert-held to the holding devices in FIGS. 13(a) and 14(a) respectively.

Figure 16:
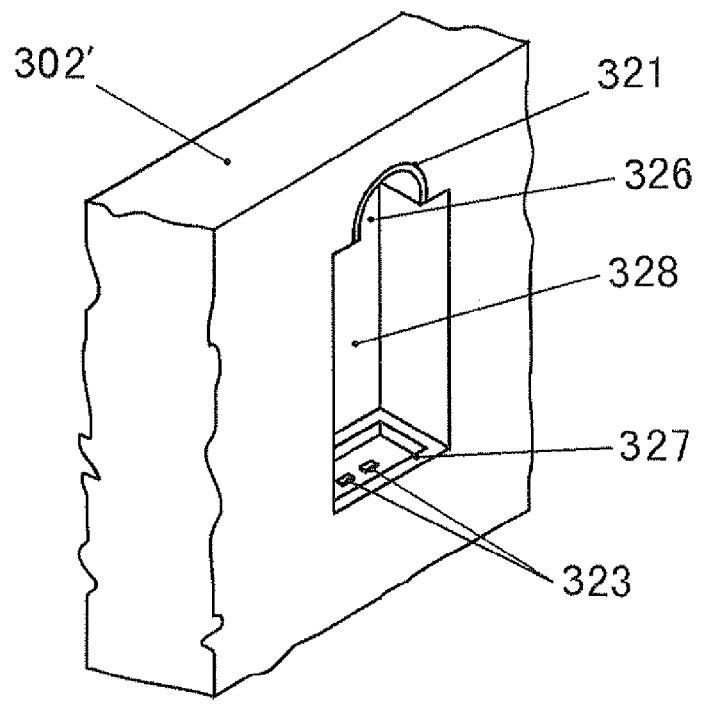
FIGS. 16(a) and 16(b) are schematic diagrams respectively showing the third embodiment of the combined apparatus of a phone holder and a wireless earset according to the invention, in which an upwardly inserting holding device and a downwardly inserting holding device are attached to a backplate of the phone holder of the apparatus respectively.
Figure 16:
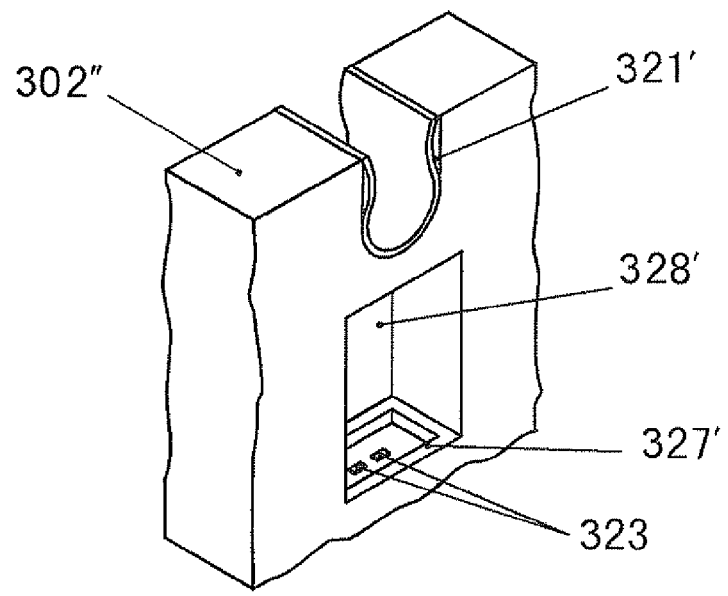

FIG. 16(a) shows that an upwardly inserting holding device is fabricated on a backplate 302' of the phone holder of the third embodiment of the invention. Reference numeral 326 denotes an upper holding cavity lined with an elastic soft material 321 of the backplate 302', and reference numeral 327 denotes a lower holding pan of the backplate 302'. It can be seen that the whole holding device is a long narrow cavity 328 formed in the backplate 302', and the use manner of the holding device is the same as the foregoing description of FIG. 13(a). Similarly, if required, the holding device can also be provided on the left holding arm 303 or the right holding arm 304 (not shown in the figure).

FIG. 16(b) shows the third embodiment of the invention, in which a downwardly inserting holding device is fabricated on a backplate 302" of the phone holder. That is, a notch is opened at the upper end of the backplate 302" and the notch is lined with the U-shaped clip 321' (or the layer of elastic soft material 321), meanwhile, the lower portion of the backplate 302" is provided with a long narrow cavity 328' and a lower holding pan 327' is fabricated therein. The use manner of the holding device is the same as the foregoing description of FIG. 14(a). Similarly, if required, the holding device can also be provided on the left holding arm 303 or the right holding arm 304 (not shown in the figure).

Figure 17:
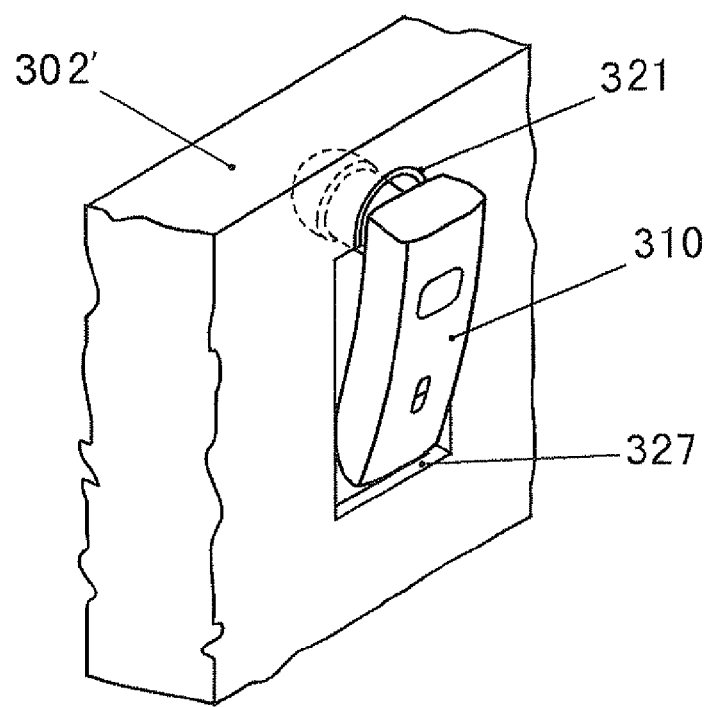
FIGS. 17(a) and 17(b) are schematic diagrams respectively showing the third embodiment of the combined apparatus of a phone holder and a wireless earset according to the invention, which show the states in which the wireless earset is insert-held to the holding devices shown in FIGS. 16(a) and 16(b) respectively.
Figure 17:
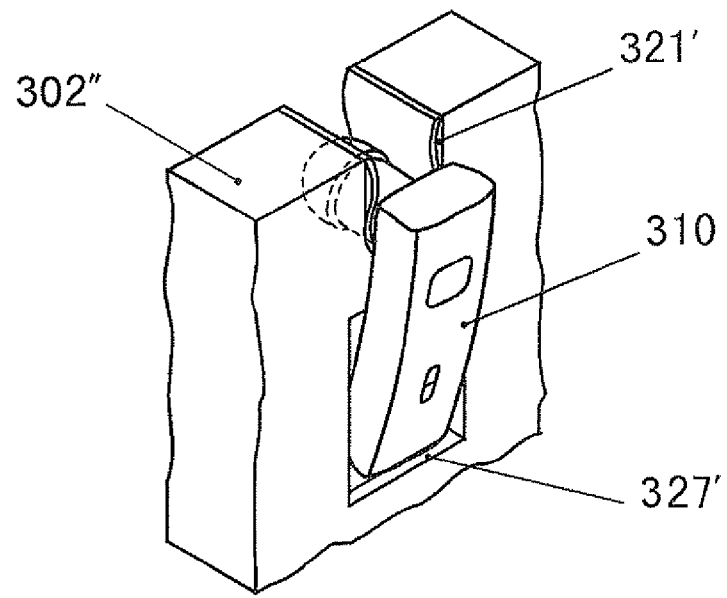

FIGS. 17(a) and 17(b) are schematic diagrams showing the states in which the wireless earset of the third embodiment of the invention is insert-held to the holding devices in FIGS. 16(a) and 16(b) respectively.

In the above embodiments, the respective holding devices described with respect to the combined apparatus of a phone holder and a wireless earset according to the invention are shown only with the ordinary and fundamental structures. In specific design and arrangement, especially when a mold for molding a plastic member is designed, various alternative arrangements are possible. The holding device for holding the wireless earset and the phone holder can be a split arrangement in which the holding device is attached to the phone holder, however, they can also be fabricated integrally. For example, the upper holding cavities 320, 320' and lower holding pan 322, 322' in FIGS. 13(a) and 14(a) are split from each other, however, they can be designed so that both the upper and the lower portions are connected integrally. These parts can be split from the right holding arm 304' or 304" (or the left holding arm 303 or the backplate 302) and attached thereto, and can also be molded integrally therewith. Further, for example, the upper holding cavity and the lower holding pan in FIGS. 16(a) and 16(b) are provided by excavating the backplate 302' or 302" (or the left holding arm 303 or the right holding arm 304), however, they can also be provided outside the backplate 302' or 302" (or the left holding arm 303 or the right holding arm 304) and attached thereto without excavating the backplate 302' or 302" (or the left holding arm 303 or the right holding arm 304), which can be modified in specific design. Further, for example, the conversion device which converts the direct current source of 12 V in the automobile into the power source suitable for the wireless earset can be built in the body of the phone holder or attached thereto, or can be provided in the plug 333 to be connected to the direct current power source of 12 V in the automobile, and the same effect will be obtained. Furthermore, the holding device can be a hanger, a cavity, a pair of Velcros and can also be magnetic sheets with opposite magnetic polarities adhered to two opposed surfaces of the earset and the holding device respectively (not shown in the figures).

What is claimed is:

1. A combined apparatus of a mobile-phone holder and a wireless earset, comprising:
a mobile-phone holder, and
a wireless earset used cooperatively with a mobile phone,
said mobile-phone holder comprises a backplate, a bottom plate, a left holding arm, a right holding arm and a mounting structure for fixation, and
said wireless earset comprises a casing, an earphone, a microphone and two electric contacts for recharging the wireless earset, wherein
at least one of said left holding arm and said right holding arm of the mobile-phone holder can be pulled out from or pushed into a side portion of the backplate to regulate a width of the mobile-phone holder, and a device which converts a direct current source of 12 V in an automobile into a power source suitable for the wireless earset is provided on the right holding arm or the left holding arm or the backplate or in a plug to be connected to a power source in the automobile, said mounting structure of the mobile-phone holder comprises an inserting groove provided on the back side of said backplate of the mobile-phone holder for inserting thereinto an inserting head of a clamping clip or a suction cup for fixation of the combined apparatus, and a holding device for holding the wireless earset is provided on the left holding arm or the right holding arm or the backplate of the mobile-phone holder, said holding device comprises one upper cavity and one lower cavity, said upper cavity of the holding device is shaped to match the earphone of the wireless earset and can accommodate the earphone, and said lower cavity of the holding device is shaped to match the lower end of the wireless earset and can accommodate said lower end and has two electric contacts which are the output end of the power source device and can correspondingly contact the two electric contacts of said wireless earset for energizing said wireless earset.

2. The combined apparatus of a mobile-phone holder and a wireless earset according to claim 1, wherein
said bottom plate of the mobile-phone holder can be pulled out from or pushed into a bottom portion of the backplate to regulate a height of the mobile-phone holder.

3. The combined apparatus of a mobile-phone holder and a wireless earset according to claim 1, wherein
the holding device is provided at an appropriate position on the left holding arm or the right holding arm of the mobile-phone holder.

4. The combined apparatus of a mobile-phone holder and a wireless earset according to claim 1, wherein
the holding device is shaped to match the wireless earset, and has a cavity which can accommodate the earphone of the wireless earset.

5. The combined apparatus of a mobile-phone holder and a wireless earset according to claim 1, wherein
a holding clip like a pen clip is also provided on the wireless earset, and
the holding device has a cavity shaped and sized so that the holding clip can be accommodated and fixed exactly.

6. The combined apparatus of a mobile-phone holder and a wireless earset according to claim 3, wherein
the holding device is an expanded cavity which is provided at an appropriate location of the mobile-phone holder, and
the cavity is shaped and sized to match the lower portion of the wireless earset, and can accommodate the wireless earset.

7. The combined apparatus of a mobile-phone holder and a wireless earset according to claim 1, wherein
the holding device holds and fixes the earphone and the lower end of the wireless earset separately.

8. The combined apparatus of a mobile-phone holder and a wireless earset according to claim 1, wherein
the holding device includes an upper holding cavity and a lower holding pan,
the upper holding cavity is U-shaped and opened downward so that the earphone portion of the wireless earset is inserted upwardly, and
the lower holding pan is a shallow pan shaped to match the lower end of the wireless earset and opened upward.

9. The combined apparatus of a mobile-phone holder and a wireless earset according to claim 1, wherein
the holding device includes an upper holding cavity and a lower holding pan,
the upper holding cavity is U-shaped and opened upward so that the earphone portion of the wireless earset is inserted downwardly, and
the lower holding pan is a shallow pan shaped to match the lower end of the wireless earset and opened upward.

10. The combined apparatus of a mobile-phone holder and a wireless earset according to claim 1, wherein
the holding device is formed by adhering one magnetic sheet to an outer surface of the wireless earset and adhering another magnetic sheet with an opposite polarity to that of the one magnetic sheet to a corresponding outer surface of the mobile-phone holder.

11. The combined apparatus of a mobile-phone holder and a wireless earset according to claim 1, wherein
the holding device is formed by adhering one piece of Velcro to an outer surface of the wireless earset and adhering another piece of matching Velcro on a corresponding outer surface of the mobile-phone holder.

12. The combined apparatus of a mobile-phone holder and a wireless earset according to claim 1, wherein
the holding device and the mobile-phone holder are provided in such a split manner that the holding device is attached to the mobile-phone holder.

13. The combined apparatus of a mobile-phone holder and a wireless earset according to claim 1, wherein
the holding device and the mobile-phone holder are fabricated integrally.

14. The combined apparatus of a mobile-phone holder and a wireless earset according to claim 1, wherein
an expansion portion is also provided on the mobile-phone holder,
a device which converts a direct current source of 12 V in an automobile into a power source suitable for the wireless earset is provided in said expansion portion,
two electric contacts for supplying power to the wireless earset are provided at appropriate locations on the surface of the holding device of the combined apparatus,
at the same time, two other electric contacts for recharging the wireless earset are also provided at corresponding locations on the outer surface of the wireless earset,
a plughole which can be connected to a power source suitable for the wireless earset which is converted from an alternating current source of 100 V~240 V is provided on the mobile-phone holder or the holding device, and
the inside end of the plughole is connected to the electric contacts which are on the holding device and for recharging the wireless earset.

15. The combined apparatus of a mobile-phone holder and a wireless earset according to claim 1, wherein
a device capable of receiving in a wired manner and storing external information is additionally provided in the wireless earset,
a port for input and output of the information is provided on the wireless earset, and
a cap which can be removed or re-capped is provided at the port.

* * * * *